(12) United States Patent
Markiton et al.

(10) Patent No.: US 7,899,586 B2
(45) Date of Patent: Mar. 1, 2011

(54) AIRCRAFT GUIDANCE SYSTEM

(75) Inventors: Vincent Markiton, Fontenilles (FR); Eric Peyrucain, Saint Genies Bellevue (FR); Lionel Bertin, Toulouse (FR); Jean-Louis De Menorval, Aussone (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 12/280,126

(22) PCT Filed: Mar. 26, 2007

(86) PCT No.: PCT/FR2007/000516
§ 371 (c)(1),
(2), (4) Date: Aug. 20, 2008

(87) PCT Pub. No.: WO2007/110503
PCT Pub. Date: Oct. 4, 2007

(65) Prior Publication Data
US 2009/0043433 A1     Feb. 12, 2009

(30) Foreign Application Priority Data
Mar. 29, 2006   (FR) ..................................... 06 02697

(51) Int. Cl.
*G06G 7/70* (2006.01)
*G06G 7/76* (2006.01)
*G01S 13/00* (2006.01)
*H04N 7/00* (2006.01)
*G01C 23/00* (2006.01)

(52) U.S. Cl. ............. 701/16; 701/120; 342/33; 348/117; 340/973

(58) Field of Classification Search .......... 340/944–980; 701/1, 3, 4, 5, 7, 11, 14, 15, 16, 17, 18, 23, 701/120; 342/33, 34, 35, 38, 410, 413; 244/3.14, 244/3.15–3.21, 76 R, 174–197, 115, 116, 244/114 B; 348/117
See application file for complete search history.

(56) References Cited

U.S. PATENT DOCUMENTS

| 4,057,782 | A | * | 11/1977 | Muller ......................... 340/972 |
| 4,368,517 | A | * | 1/1983 | Lovering ........................ 701/16 |
| 5,220,681 | A | * | 6/1993 | Belgin ........................ 455/156.1 |
| 5,420,582 | A | * | 5/1995 | Kubbat et al. ................. 340/974 |
| 5,745,054 | A | * | 4/1998 | Wilkens ........................ 340/972 |
| 5,978,715 | A | * | 11/1999 | Briffe et al. ..................... 701/11 |
| 5,987,631 | A | * | 11/1999 | Kong ............................. 714/704 |
| 6,112,141 | A | * | 8/2000 | Briffe et al. ..................... 701/14 |
| 6,405,107 | B1 | * | 6/2002 | Derman ............................. 701/3 |
| 6,567,014 | B1 | * | 5/2003 | Hansen et al. ................. 340/980 |
| 6,693,559 | B1 | | 2/2004 | Gyde |
| 7,522,977 | B2 | * | 4/2009 | Foucart et al. .................. 701/16 |

(Continued)

OTHER PUBLICATIONS

International Search Report dated Aug. 2, 2007 w/ English translation.

(Continued)

*Primary Examiner* — Jack Keith
*Assistant Examiner* — Muhammad Shafi
(74) *Attorney, Agent, or Firm* — Dickinson Wright PLLC

(57) ABSTRACT

A guidance system includes a device to generate an alphanumeric identification characteristic, enabling identification of a data item which is used for a selected guidance mode of an aircraft. The system also includes a display unit which automatically shows the alphanumeric identification characteristic on a display screen.

8 Claims, 1 Drawing Sheet

U.S. PATENT DOCUMENTS

2003/0122701 A1* 7/2003 Tran .............................. 342/29
2003/0132860 A1* 7/2003 Feyereisen et al. ........... 340/973
2004/0068372 A1* 4/2004 Ybarra et al. ................. 701/301
2004/0183698 A1* 9/2004 Rouquette et al. ............ 340/972
2004/0199304 A1* 10/2004 Tatham et al. ................. 701/16

OTHER PUBLICATIONS

Written Opinion of the International Searching Authority with English translation.

* cited by examiner

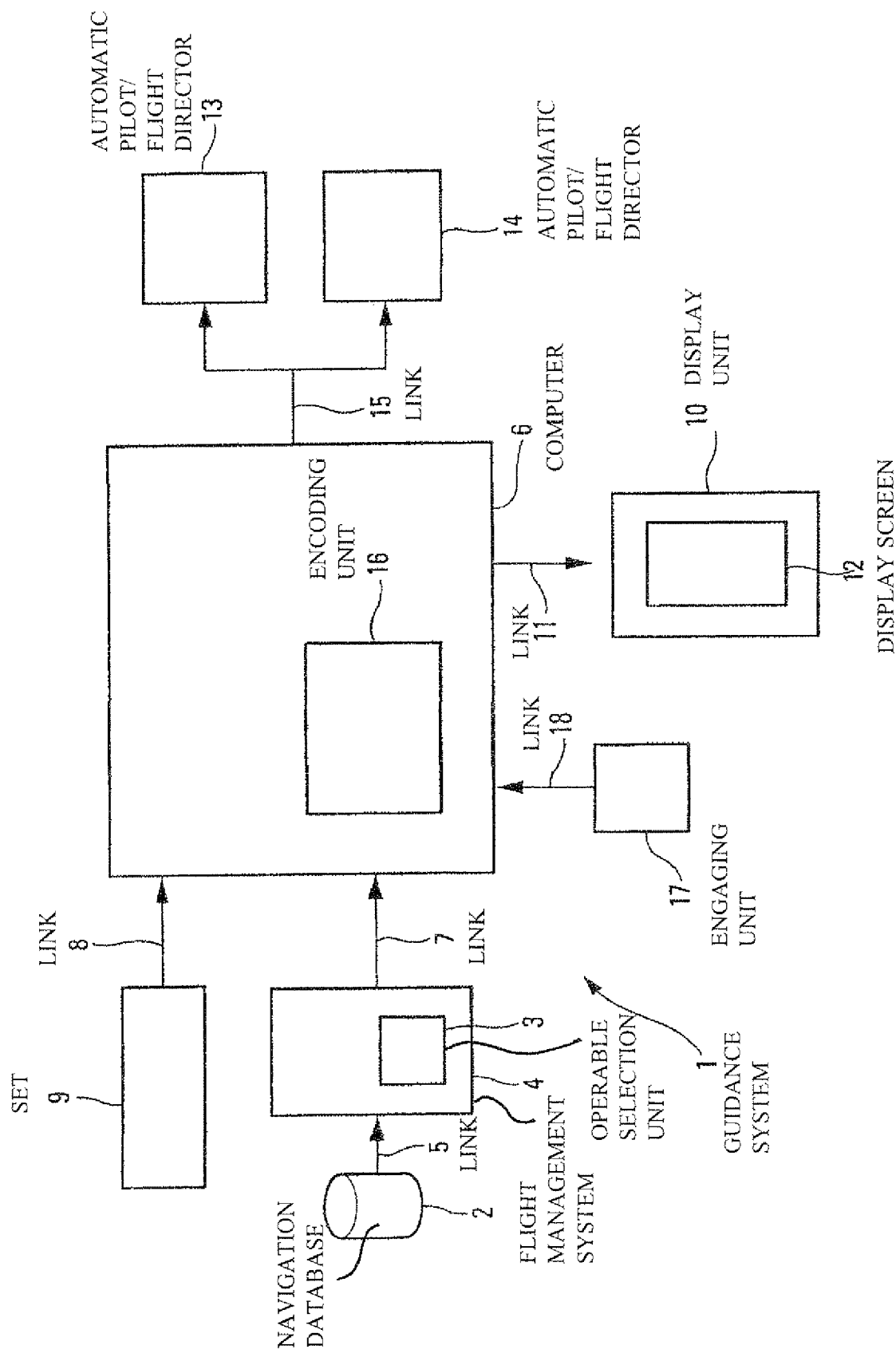

AIRCRAFT GUIDANCE SYSTEM

FIELD OF THE INVENTION

The present invention relates to an aircraft guidance system.

SUMMARY OF THE INVENTION

Specifically, it relates to a guidance system of the type comprising at least:
- a database comprising at least data relating to the terrain to be flown over by the aircraft;
- an operable selection means, enabling a pilot of the aircraft to select a particular guidance mode;
- a computer determining, when a guidance mode is selected, for example an approach mode, guidance instructions dependent on at least one data item (axis, path, etc.):
  - which comprises at least one particular parameter (tilt angle, altitude of a geographic point, etc.);
  - which is obtained from said database; and
  - which must be used for said selected guidance mode; and
- display means comprising at least one display screen.

The present invention applies in particular to an autonomous approach to a runway, in particular in the military domain. It can also apply to civilian programs relating to approach, go-around or take-off procedures without ground landing aid means of LS (landing system) type such as ILS, GLS, MLS, and so on, with high precision and integrity, that is, with aircraft performance levels that are almost as restrictive as for precision approaches.

In the context of the present invention, it is considered that, in an autonomous approach, the aircraft needs to fly in instrument meteorological conditions (IMC), to a decision height, for example 200 feet (approximately 60 meters), which corresponds to the decision height in a precision approach of ILS (instrument landing system) type, without the use of navigation means located on the ground. In such an autonomous approach, the positioning means used by the aircraft are therefore exclusively onboard means, and in particular a satellite positioning system, for example of GNSS (global navigation satellite system) type, such as Galileo or GPS (global positioning system), an inertial unit, and barometric sensors. The same applies for an approach, go-around or take-off procedure of the abovementioned type.

In approach, at said decision height, the crew of the aircraft must visually acquire the runway. If it does, it finishes the landing in visual mode using manual guidance. On the other hand, if at this decision height, the crew does not see the runway, it must perform a go-around so as to take the aircraft back up to a predetermined safe altitude.

The approach path used to perform such an autonomous approach is created before the flight and described on a paper map which is available to the crew during the flight. For this, the configuration of the terrain around the runway has been analyzed and margins with respect to obstacles have been defined. This approach path is also saved in said database of the guidance system.

Thus, in a flight, when the crew decides to fly using an autonomous approach, or an approach, go-around or take-off procedure with high precision and integrity, it inserts the appropriate procedure into the flight plan, via said selection means which generally corresponds to an interface means of a flight management system of the aircraft. Said flight management system then creates, from information obtained from the database, a reference path (corresponding to a virtual approach axis in the case of an autonomous approach). From this reference path and from the current position in three dimensions of the aircraft, which is known from onboard means, said computer of the guidance system computes guidance instructions which are followed, usually, automatically by an automatic pilot of the aircraft or manually by the crew using a flight director.

However, before implementing such an autonomous approach, or such an approach, go-around or take-off procedure with high precision and integrity, the crew must secure the reference path used by said computer to compute the guidance instructions. In practice, this reference path is considered critical, since an error concerning it would cause the aircraft to follow a wrong trajectory, for which there is a risk that the aircraft will depart from a flight domain that is secure with respect to obstacles. In this case, the aircraft could come into collision with the relief or external obstacles.

Generally, to secure the reference path in this way, the crew compares the information concerning this reference path that is indicated on said paper map that is available to it, with information relating to said reference path that is displayed by said computer on the display screen of the display means.

However, in the context of an autonomous approach, such a verification presents a very heavy workload for the crew, in particular when the aircraft is a military airplane for which the workload is increased by the tactical situation of the latter (possibility of being in enemy territory with, in particular, an obligation to monitor the presence of any threats). The workload involved in such a verification is heavy, particularly because the data relating to the approach axis includes in particular latitude and longitude values of a geographic point, values which each contain a large number of figures to be verified. Furthermore, the probability of errors on the part of the crew at the time of the verification is increased in such a situation because of the stress that then exists.

Furthermore, in the context of an approach, go-around or take-off procedure with high precision and integrity, the comparison by the pilot of the characteristics of the procedure with the paper map does not make it possible to achieve the required integrity level (probability of error less than $10^{-9}$ for each procedure).

The object of the present invention is to remedy these drawbacks. It concerns an aircraft guidance system, in particular for a civilian or military transport airplane, which enables the crew of the aircraft to quickly, safely and effectively monitor the predetermined data that is used in a particular guidance mode of the aircraft (in particular in an autonomous approach) to determine guidance instructions for the aircraft.

To this end, according to the invention, said guidance system of the type comprising at least:
- a navigation database;
- an operable selection means, enabling a pilot of the aircraft to select a particular guidance mode;
- a computer determining, when a guidance mode is selected, guidance instructions dependent on at least one data item:
  - which comprises at least one particular parameter;
  - which is obtained from said database; and
  - which must be used for said selected guidance modes; and
- display means comprising at least one display screen, is noteworthy in that:
- said guidance system includes auxiliary means (specified hereinbelow) to generate an identification characteristic of alphanumeric type, preferably determined using a cyclic redundancy code, and making it possible to identify said data item which must be used for said selected guidance mode; and said display means are made in such a way as to automatically present said identification characteristic of alphanumeric type on said display screen, when said guidance mode is selected.

Thus, thanks to the invention, a data item (prestored in the database) which is used by said computer to compute guidance instructions for the aircraft, is displayed in the form of an identification characteristic which is represented using a short code and which is therefore simple and easy to monitor, as specified hereinbelow.

Consequently, if a data item which is thus displayed in the form of an identification characteristic on the display screen is also represented, in this form, on a paper map available to the crew, it is simple and easy for the latter to perform the abovementioned verification consisting in comparing the two identification characteristics which each have a small number of alphanumeric elements (figures and/or letters).

In a particular embodiment:

said guidance system also comprises:

at least one guidance means, for example an automatic pilot or a flight director, which is intended to assist in the guidance of the aircraft, by using the guidance instructions determined by said computer; and an operable engaging means, enabling a pilot of the aircraft to engage a selected guidance mode, so as to make it possible to automatically transmit said guidance instructions from said computer to said guidance means for them to be used for guiding the aircraft; and said computer is made in such a way as to fix said data item used, immediately said guidance mode is engaged, and as long as said guidance mode remains engaged.

In a first embodiment, said auxiliary means include said computer which is made in such a way as to automatically determine, using a particular encoding means, when said guidance mode is selected, said identification characteristic of alphanumeric type making it possible to identify said data item which must be used for said selected guidance mode.

Furthermore, in this first embodiment:

said guidance system is made in such a way as to guide the aircraft at least in an autonomous runway approach phase (as specified above), along a virtual approach axis;

said database includes, as data, at least said virtual approach axis which is defined by a plurality of parameters; and said computer forms an identification characteristic making it possible to identify said parameters which define said virtual approach axis.

In this case, advantageously, said approach axis is defined by the following five parameters: a magnetic orientation, a gradient, and a latitude, a longitude and an altitude of an anchor point (which is, for example, positioned at 50 feet above the ground), and said computer forms an identification characteristic comprising five alphanumeric identification elements (numerals and/or letters) which respectively identify said five parameters.

Moreover, advantageously, said computer comprises an encoding means employing a cyclic redundancy code of standard type.

Moreover, in a second embodiment, said auxiliary means include said navigation database which contains said identification characteristic of alphanumeric type making it possible to identify said data item which must be used for said selected guidance mode. Preferably, this identification characteristic has also been formed using a cyclic redundancy code of the abovementioned type.

In this second embodiment, said system is made in such a way as to guide the aircraft along a reference path in one of the following phases (as specified above) which are of autonomous type and present a high integrity and precision: an approach phase, a go-around phase and a take-off phase, and said database includes at least said reference path as data, and an identification characteristic making it possible to identify said reference path.

In this case, advantageously, said computer is made in such a way as to automatically compare said reference path received from said database with said corresponding identification characteristic also received from said database and, if the result of this comparison indicates that these elements are identical, said display means automatically present said reference path and said corresponding identification characteristic on said display screen.

BRIEF DESCRIPTION OF THE DRAWINGS

The single FIGURE of the appended drawing will clearly show how the invention can be implemented. This single FIGURE is a block diagram of a guidance system according to the invention.

DETAILED DESCRIPTION OF THE INVENTION

The system 1 according to the invention diagrammatically represented in the figure is intended to guide an aircraft (not represented), in particular a military or civilian transport airplane.

This guidance system 1, which is onboard, is of the type comprising:

a navigation database 2, which includes at least data relating to the terrain to be flown over by the aircraft;

a selection means 3 which can be operated, which enables a pilot of the aircraft to select a particular guidance mode, and which, for example, is part of a standard system 4, of FMS (flight management system) type, which can be linked via a link 5 to said database 2;

a computer 6, for example a computer of FG (flight guidance) type, which is linked via a link 7 to said flight management system 4 and via a link 8 to a set 9 of information sources. This set 9 is not described in more detail, but includes, for example, a means for determining the current position in three dimensions of the aircraft during the flight;

display means 10 which are linked via a link 11 to said computer 6 and which can display information on a display screen 12; and standard guidance means, for example an automatic pilot 13 and a flight director 14, which are linked via a link 15 to said computer 6 and which are intended to help in guiding the aircraft, by using guidance instructions which are determined by said computer 6.

The computer 6 determines, when a particular guidance mode is selected using said selection means 3, guidance instructions which relate to this particular guidance mode and which depend on at least one data item (path, profile, position, etc.):

which comprises at least one particular parameter (making it possible to define or characterize this data item);

which is obtained from said database 2; and which must be used by said guidance mode selected using said selection means 3.

In order to enable the crew of the aircraft to quickly and safely monitor predetermined data which is used by said computer 6 to determine the guidance instructions in a particular guidance mode, said display means 10 are made, according to the invention, in such a way as to automatically present, on said display screen 12, an identification characteristic of alphanumeric type making it possible to identify at least one data item which must be used for said selected guidance mode.

Thus, the system 1 according to the invention displays, via said display means 10, in the form of an identification characteristic, at least one data item (specified hereinbelow) which is prestored in the database 2 and which is used by the computer 6 to compute the guidance instructions for the aircraft. Furthermore, this identification characteristic is presented in the form of a short code (of alphanumeric type) so as to be able to be monitored quickly and safely.

Furthermore, if a data item that is thus displayed on the display screen 12 in the form of an identification characteristic is also represented in this same form on another medium, for example on a paper map, which is available to the crew, it is a simple and easy task for the crew of the aircraft to verify whether the data displayed and used by the computer 6 is indeed in accordance with the required data which is presented on this other medium. Such a comparison can be performed simply and quickly, since each of the two identification characteristics presents a small number of alphanumeric elements, namely a small number of numerals and/or letters, as specified hereinbelow.

Of course, if the crew needs to verify a plurality of data items that are used simultaneously by the computer 6 to compute guidance instructions, the system 1 provides an identification characteristic for each of these data items, and the display means 10 simultaneously display all these identification characteristics.

Each data item can comprise a single parameter or a plurality of parameters. In the latter case, an encoding is performed for each of the various parameters, in particular using an encoding means 16 which is, for example, integrated in said computer 6, and the resultant identification characteristic comprises a plurality of elements respectively corresponding to these various parameters. In a preferred embodiment, said encoding means 16 employs a cyclic redundancy code of standard type. In a particular embodiment, the encoding method used by this encoding means 16 must guarantee a predetermined (coding) error probability, for example $10^{-9}$.

Moreover, in a first embodiment, said guidance system 1 is made in such a way as to be able to guide the aircraft at least in an autonomous runway approach phase. As indicated previously, such an approach phase can be performed along a virtual approach axis which is defined before the flight, in order to ensure a protection envelope of the path of the aircraft with respect to obstacles and the relief of the terrain being flown over. It is known that such a virtual approach axis is represented by:

- an anchor point, for which the latitude, longitude and altitude must be known;
- a magnetic orientation; and
- a gradient value.

In this case, said computer 6 is made in such a way as to automatically determine, using the integrated encoding means 16, when said guidance mode is selected, an identification characteristic of alphanumeric type making it possible to identify said data item which must be used for said selected guidance mode.

In this first embodiment, the data item to be encoded therefore represents said virtual approach axis, and it comprises five parameters, namely the magnetic orientation, the gradient, the latitude of the anchor point, the longitude of this anchor point and the altitude of said anchor point. Thus, the computer 6 forms an identification characteristic which preferably comprises five alphanumeric identification elements, for example five numerals or five letters, which respectively identify the preceding five parameters.

Furthermore, in this first embodiment, the abovementioned encoding is performed on two levels:

- before the flight, when said virtual approach axis is defined on the ground. The identification characteristic then determined is retranscribed onto an approach map (which is available to the crew of the aircraft during the ensuing flight) and
- during the flight, by the computer 6, using in particular information received from said database 2. The identification characteristic determined by said computer 6 is displayed on the display screen 12, as indicated previously.

Consequently, in this first embodiment, when, during a flight of the aircraft, the crew selects, using the selection means 3 of the flight management system 4, an autonomous approach, the latter is inserted into the flight plan of the aircraft, and the flight management system 4 extracts from the database 2 the parameters that define the virtual approach axis associated with this autonomous approach. These parameters are retransmitted by the flight management system 4 to the computer 6 which then computes the corresponding identification characteristic, and displays it on the display screen 12. At this moment, the crew must perform a first verification of this identification characteristic, by comparing it with that which is indicated on the approach map available to it. When the autonomous approach is finally authorized, for example by an air traffic controller located on the ground, the crew engages the autonomous approach using an engaging means 17 which is linked via a link 18 to said computer 6, that is, it couples the automatic pilot 13 and/or the flight director 14 to the guidance instructions of the autonomous approach, determined by the computer 6. These guidance instructions are computed based on the abovementioned parameters defining the virtual approach axis, and on the current position in three dimensions of the aircraft, received from said set 9. At this moment, for each procedure, the crew must again verify the identification characteristic displayed on at least said display screen 12 with that of the approach map. In parallel, the computer 6 fixes the parameters used regarding the approach axis so that these parameters can no longer be modified so long as the approach remains engaged. If the crew wants to implement a new approach, it must disengage the current approach, before selecting a new approach using the selection means 3.

Moreover, in a second embodiment, said guidance system 1 is made in such a way as to guide the aircraft along a reference path in one of the following phases: an approach phase, a go-around phase and a take-off phase. These phases are autonomous in the civilian domain and present high integrity and precision. In this case, said database 2 includes at least said reference path as data, and an identification characteristic making it possible to identify this reference path. This identification characteristic is determined by the procedure designers and incorporated in the navigation database 2 with the procedure concerned which contains all the elements needed to define the reference path (waypoints, paths between successive waypoints, gradients, etc.). This identification characteristic is automatically verified by the computer 6 (flight guidance computer) which presents a very high integrity level, each time the reference path is transmitted.

This reference path and the corresponding identification characteristic are also displayed to be verified by the pilot.

The aim of the identification characteristic is to guarantee with a good level of probability all the parameters that define the reference path used by the computer 6 in an approach, go-around or take-off procedure, and so to assure the crew that the reference path is secured through this new parameter. The identification characteristic is determined by using an identification characteristic encoding method, which is applied to each of the parameters of the reference path to be secured. The encoding method must ensure an error probability of $10^{-9}$ for the parameters of the reference path.

It will be noted that the reference path is defined by the procedure designers, so as to obtain predetermined margins in respect of the obstacles and the relief of the terrain. The reference path is therefore represented, usually, by a succession of waypoints (identified in longitude, latitude and altitude) and straight-line or curved segments. It is saved in the database 2 and is selected with its identification characteristic.

In the context of an approach, go-around or take-off procedure with high precision and integrity, the parameters of the reference path are transmitted by the flight management system 4 (from the database 2) to the (flight guidance) computer 6. The same applies for the corresponding identification characteristic. The (flight guidance) computer 6 then verifies the consistency between this identification characteristic and the parameters of the reference path. If the verification is conclusive, the path is validated, and the pilot can use it through the guidance means. Otherwise, the reference path is invalidated, which prevents the aircraft from being flown along this reference path with the guidance means.

The invention claimed is:

1. An aircraft guidance system, said guidance system comprising:
    a navigation database;
    an operable selection device, enabling a pilot of the aircraft to select a guidance mode;
    a computer determining, when the guidance mode is selected, guidance instructions depending on at least one data item obtained from said database and being employed for said selected guidance mode, the at least one data item comprising at least one parameter enabling the at least one data item to be defined; and
    a display unit comprising at least one display screen, wherein:
    said guidance system includes an auxiliary device to generate an identification characteristic of an alphanumeric type to identify said at least one data item employed for said selected guidance mode, and
    said display unit automatically presents said identification characteristic of said alphanumeric type on said display screen, when said guidance mode is selected, wherein:
    the aircraft is guided at least in an autonomous runway approach phase, along a virtual approach axis, said database includes, as data, at least said virtual approach axis which is defined by a plurality of parameters, and said computer forms an identification characteristic to identify said parameters which define said virtual approach axis, and
    said virtual approach axis is defined by the following five parameters: a magnetic orientation, a gradient, a latitude, a longitude and an altitude of an anchor point, and said computer forms an identification characteristic comprising five alphanumeric identification elements which respectively identify said five parameters.

2. The system as claimed in claim 1, wherein said guidance system further comprises:
    at least one guidance device to assist in guiding the aircraft, by employing the guidance instructions determined by said computer, and
    an operable engaging device, enabling a pilot of the aircraft to engage said selected guidance mode, to allow for automatic transmission of said guidance instructions from said computer to said guidance device in order for the instructions to be employed for the guidance of the aircraft; and
    said computer fixes said at least one data item employed, said guidance mode is immediately engaged, and said guidance mode remains engaged.

3. The system as claimed in claim 1, wherein said auxiliary device includes said computer which automatically determines, employing an encoding unit, when said guidance mode is selected, said identification characteristic of said alphanumeric type-enabling identification of said at least one data item employed for said selected guidance mode.

4. The system as claimed in claim 3, wherein said computer comprises the encoding unit employing a cyclic redundancy code.

5. An aircraft, comprising a guidance system as specified under claim 1.

6. The system as claimed in claim 1, wherein:
    said auxiliary device includes said computer which automatically determines, employing an encoding unit when said guidance mode is selected, said identification characteristic of said alphanumeric type to identify said at least one data item used for said selected guidance mode,
    the aircraft is guided at least in an autonomous runway approach phase, along a virtual approach axis, said database includes, as data, at least said virtual approach axis which is defined by a plurality of parameters, and said computer forms an identification characteristic to identify said parameters which define said virtual approach axis, and
    said virtual approach axis is defined by the following five parameters: a magnetic orientation, a gradient, a latitude, a longitude and an altitude of an anchor point, and said computer forms an identification characteristic comprising five alphanumeric identification elements which respectively identify said five parameters.

7. The system as claimed in claim 1, wherein said alphanumeric type is represented using a short code.

8. The system as claimed in claim 1, wherein during said autonomous runway approach phase, a crew performs a first verification of the identification characteristic by comparing the identification characteristic with information indicated on an approach map, and a the crew performs a second verification of the identification characteristic with the approach map once the autonomous approach is authorized.

* * * * *